(12) United States Patent
Sadowski et al.

(10) Patent No.: US 8,106,804 B2
(45) Date of Patent: *Jan. 31, 2012

(54) VIDEO DECODER WITH REDUCED POWER CONSUMPTION AND METHOD THEREOF

(75) Inventors: Greg Sadowski, Cambridge, MA (US); George Jacobs, Sterling, MA (US); Paul Chow, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,579

(22) Filed: Aug. 24, 2010

(65) Prior Publication Data

US 2010/0322318 A1 Dec. 23, 2010

Related U.S. Application Data

(63) Continuation of application No. 11/469,335, filed on Aug. 31, 2006, now Pat. No. 7,804,435.

(51) Int. Cl.
*H03M 1/12* (2006.01)
(52) U.S. Cl. .................................... 341/155; 341/157
(58) Field of Classification Search .................. 341/155, 341/157, 158; 375/219, 316, 345
See application file for complete search history.

(56) References Cited

U.S. PATENT DOCUMENTS

| | | | |
|---|---|---|---|
| 5,711,672 A | 1/1998 | Redford et al. | |
| 5,719,800 A | 2/1998 | Mittal et al. | |
| 5,734,779 A | 3/1998 | Okino | |
| 5,978,509 A * | 11/1999 | Nachtergaele et al. | 382/236 |
| 6,332,168 B1 | 12/2001 | House et al. | |
| 6,477,654 B1 | 11/2002 | Dean et al. | |
| 6,795,930 B1 | 9/2004 | Laurenti et al. | |
| 6,957,422 B2 | 10/2005 | Hunt | |
| 6,978,085 B1 | 12/2005 | Maeda et al. | |
| 7,174,392 B2 | 2/2007 | Tervo | |
| 7,227,847 B2 | 6/2007 | Gluck | |
| 7,248,631 B2 * | 7/2007 | Wilson | 375/240.01 |
| 7,372,999 B2 * | 5/2008 | Oneda et al. | 382/232 |
| 7,401,240 B2 | 7/2008 | Heller et al. | |
| 7,804,435 B2 * | 9/2010 | Sadowski et al. | 341/155 |
| 7,929,060 B2 * | 4/2011 | Yun et al. | 348/730 |
| 2003/0184271 A1 | 10/2003 | Aisaka et al. | |
| 2004/0010785 A1 | 1/2004 | Chauvel et al. | |
| 2004/0039954 A1 | 2/2004 | White et al. | |
| 2004/0136596 A1 | 7/2004 | Oneda et al. | |
| 2004/0158748 A1 | 8/2004 | Ishibashi et al. | |

(Continued)

OTHER PUBLICATIONS

International Search Report and Written Opinion; International Application No. PCT/US2007/077346; dated Aug. 14, 2008.

*Primary Examiner* — Brian Young
(74) *Attorney, Agent, or Firm* — Baker & Daniels LLP

(57) ABSTRACT

A video decoder (10) with reduced power consumption includes a power management controller (45) that is operative to select one of a plurality of different power consumption states for a video decoder (10), and, in response to the determination, vary power consumption of at least one operational portion of the video decoder (10). In addition, in one example, a method (200) for reducing power consumption for a video decoder (10) includes determining input stream encoding description data (34) to select one of a plurality of different power consumption states for a video decoder (10) and, in response to the determination, varying power consumption of at least one operational portion of the video decoder (10).

20 Claims, 12 Drawing Sheets

U.S. PATENT DOCUMENTS

| | | |
|---|---|---|
| 2004/0158752 A1 | 8/2004 | Borza et al. |
| 2004/0268316 A1 | 12/2004 | Fisher et al. |
| 2005/0081107 A1 | 4/2005 | DeWitt, Jr. et al. |
| 2005/0200627 A1 | 9/2005 | Desylva |
| 2005/0232136 A1 | 10/2005 | Kwak |
| 2005/0273636 A1 | 12/2005 | Grobman |
| 2006/0044468 A1 | 3/2006 | Chowdhury et al. |
| 2006/0123262 A1 | 6/2006 | Bullman |
| 2006/0136764 A1 | 6/2006 | Munguia |
| 2007/0064159 A1 | 3/2007 | Kim et al. |
| 2008/0055119 A1 | 3/2008 | Sadowski et al. |
| 2008/0059823 A1 | 3/2008 | Balatsos et al. |

\* cited by examiner

VIDEO DECODER WITH REDUCED POWER CONSUMPTION AND METHOD THEREOF

RELATED CO-PENDING APPLICATION

This is a continuation application of copending application Ser. No. 11/469,335, entitled VIDEO DECODER WITH REDUCED POWER CONSUMPTION AND METHOD THEREOF, filed on Aug. 31, 2006, having as inventors Greg Sadowski et al., and owned by instant assignee and incorporated by reference in its entirety, which is a related application of copending application Ser. No. 11/469,326, entitled BATTERY-POWERED DEVICE WITH REDUCED POWER CONSUMPTION AND METHOD THEREOF, filed on Aug. 31, 2006, having as inventors Aris Balatsos et al., and owned by instant assignee and incorporated by reference in its entirety.

FIELD OF THE INVENTION

The invention relates generally to video decoders and, more particularly, to a video decoder with reduce power consumption and method thereof.

BACKGROUND OF THE INVENTION

Despite improvements in rechargeable battery technology, battery capability continues to limit performance of mobile electronic devices. In particular, limited energy capacity results in relatively short device run-times, of, for example, only a few hours, between recharging or switching batteries. In addition, functional integration, such as in the example of integrating camera functions onto a cellular telephone handset, results in popular multiple function devices yet may increase energy consumption. Video encoding/decoding operations such as MPEG, H.264, VC-1 based encoding and/or decoding or other video coding circuits can consume limited battery power.

Power conservation techniques may be used to compensate for battery limitations in battery-powered devices. For example, low power modes may be used to conserve power by selectively shutting down certain components or functional blocks within components. Alternatively, power may be saved by reducing power supply voltages or clocking frequencies. Typical low power modes are entered either by direct operator interaction, such as by placing the device to low power mode, or by a triggering event. A triggering event may occur when, for example, the battery capacity drops below a certain threshold. Alternatively, a low power mode may be triggered when certain functional blocks in the device have not been used or accessed for some period of time. These triggering events may be useful for conserving battery power; however, each is reactive rather than proactive. That is, significant battery may be consumed prior to triggering. As a result, the triggering techniques may not be sufficient to provide sufficient energy conservation in all cases. Since video decoders in battery-powered devices can consume significant energy, improved video decoders with reduce power consumption and methods thereof would be desirable.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE INVENTION

Figure 1:
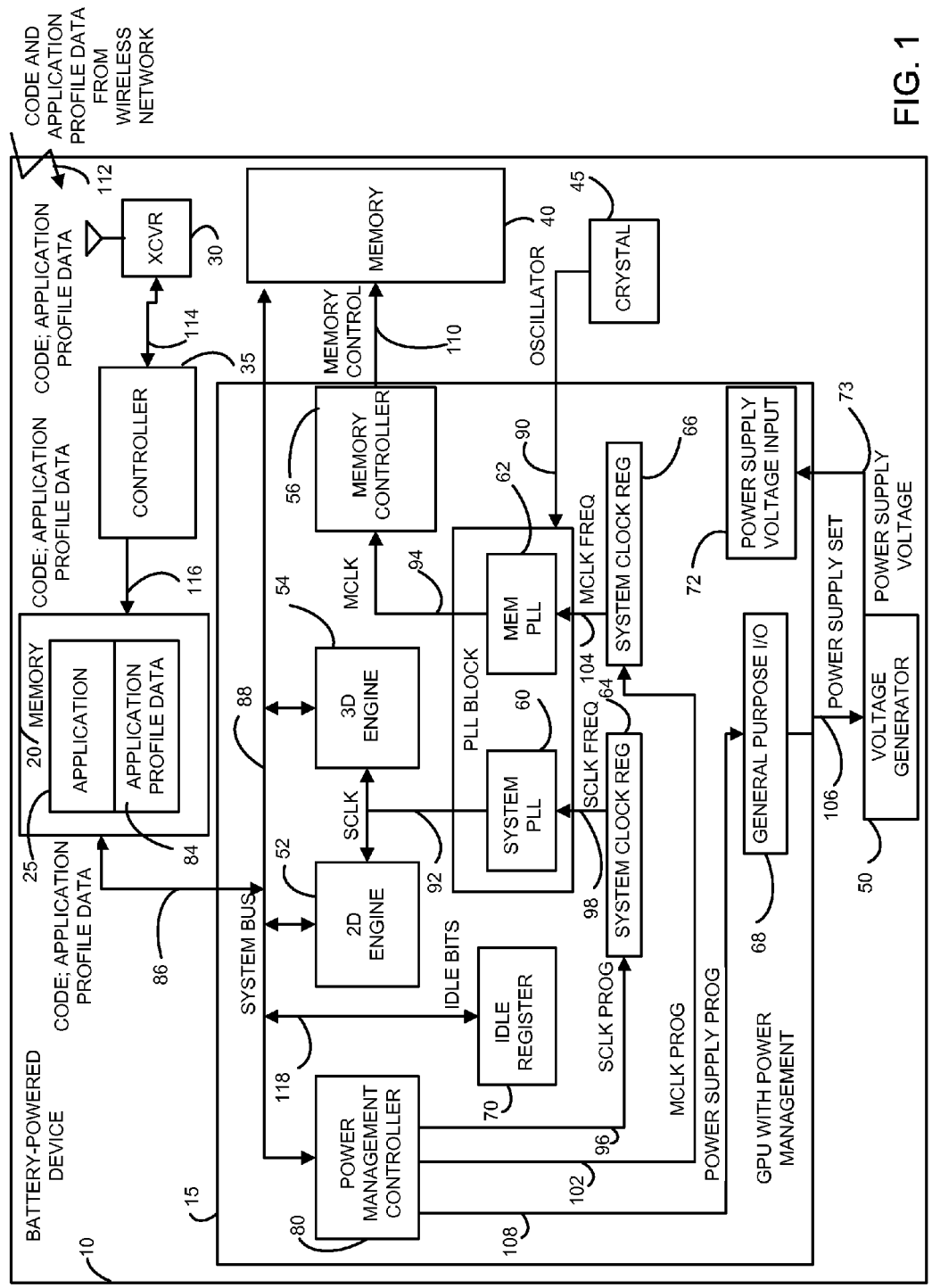
FIG. 1 is one example of a battery-powered device depicting one embodiment of the invention.

Briefly, an apparatus employs a power management controller, in response to a determination of encoding description data and varies power consumption of at least one operational portion of a video decoder. The apparatus may also include the decoder. In addition, in one example, a method for reducing power consumption for a video decoder includes determining input stream encoding description data to select one of a plurality of different power consumption states for a video decoder and, in response to the determination, varying power consumption of at least one operational portion of the video decoder.

In one example, a video decoder is disclosed with reduced power consumption. Power is proactively and automatically conserved prior to significant battery discharge and without operator intervention. Power consumption is varied in portions of the video decoder in response to encoding characteristics from an input data stream to minimize power consumption while achieving required performance. Other advantages will be recognized by one of ordinary skill in the art.

In another embodiment, a device includes a processor that is operative to process a data stream such as executable code, encoded video or other suitable data stream, and has a plurality of processor portions. The device further includes a power management controller coupled to the processor portions that controls power consumption of the processor portions based on information associated with or in the data stream. The information may include application profile data included with executable code that directly indicates usage/nonusage of portions of the processor or the data stream may have use data inherent in the stream, that indirectly identifies usage of the processor portions. In addition, in one example, a method for reducing power consumption for a battery powered device includes executing code that includes application profile data identifying usage of portions of a first processor during runtime of an application; and, in response to the application profile data, controlling power consumption of the identified first processor portions during runtime. In addition, in one example, a battery-powered device includes memory that stores the code and a first processor coupled to the memory and operative to execute the code. The power management controller may be part of the processor or external thereto. The application profiling data may be generated by an application developer and embedded as header information in the code or may be generated by the device the first time the application is run on the device, or at any other suitable time. In such a case, it may be necessary to create header information specific to a particular device or class of devices reflective of the differing capabilities and/or processors (or portions thereof). In this case, it may be desirable applications with embedded header information that is specific to a particular device (or class of devices). Alternatively, the header information may include more than one header information portions with each portion associated with a particular device (or class of devices). In a further alternative, the application could be transferred to a device without any header information but, instead, be transferred with associated (but separate) application profile data. In such an embodiment, the application could be unchanged for a variety of devices (or classes of devices) while only device (or device class) specific application profile data would vary between the variety of devices (or classes of devices).

As such, a battery-powered device is disclosed with reduced power consumption wherein power is proactively and automatically conserved prior to significant battery discharge and, if desired, without operator intervention. Portions of a processor included in the device are automatically identified for power consumption based on application runtime profiling. Power is conserved in the identified portions using any desired power saving method. The power consumption technique is useful for a wide variety of battery-powered devices. Other advantages will be recognized by one of ordinary skill in the art.

FIG. 1 is one example of a battery-powered device 10 depicting one example of one embodiment of the invention. The battery-powered device 10 may be a handheld device or a non-handheld device. For purposes of illustration only, and not limitation, FIG. 1 illustrates an example where a data stream is considered executable code with header information that includes application profile data. A later example will be set forth below where the data stream is an encoded video data stream. However it will be recognized that any suitable data stream and device may be employed. It should be recognized that while in many instances the "header information" may be placed at or near the beginning of a data stream it could, in many instances, be placed elsewhere in the data stream.

The battery-powered device 10 may have wireless capability and/or non-wireless capability. The battery-powered device 10 may, for example, be a wireless telephone, a personal computer, a digital assistant (such as a personal digital assistant—PDA), a digital entertainment/playback device, a radio communication device, a tracking device, a personal training device, a global positioning device, a camera, a video recorder, a video game controller, a television receiver, a digital video player, a printing device, a digital display, a combination thereof or any suitable device.

The battery-powered device 10 includes a processor 15 and a memory 20 including application code 25 in any suitable format. As used herein code or application can also include data if desired. The battery-powered device 10 may further include a wireless network interface including a wireless transceiver 30 operatively coupled to a controller 35. The battery-powered device 10 may further include additional memory 40, a crystal oscillator 45, and a voltage generator 50 operatively to the processor 15.

For purposes of illustration only, the processor 15 is shown as a graphics processing core (GPU) or multimedia processing core. However, processors of other types, architectures, and capabilities may be used as will be recognized by one skilled in the art. For example, a digital signal processor (DSP), microcontroller, central processing unit, baseband processor, co-processor, or any suitable processing circuit(s) may be used. In addition the processor 15 may be discrete logic, or any suitable combination of hardware, software or firmware or any suitable structure. The processor 15 may be made up of several portions, or functional blocks. The portions provide or control functions contributing to the function of the overall processor 15. The operating portions may include, but are not limited to, a 2D engine 52, a 3D engine 54, a memory controller 56, a phase-lock loop (PLL) circuit including system PLL 60 and memory PLL 62, clock frequency registers including system clock register 64 and main clock register 66, a general purpose input/output registers 68, an idle bit register 70, and a power supply voltage input 72. The processor 15 further includes a power management controller 80. The processor 15 may further include arithmetic units, on-chip memory, address decoders and encoders, video decoders and encoders, co-processors, and other portions as are known in the art.

The operational instructions, such as executable code 25, or software, executed by the processor 15 are stored in memory 20 which may include any suitable digital storage medium including, but not limited to, RAM, ROM, flash memory, hard disk drive, distributed memory such as servers with memory on a network, CD-ROM or any suitable storage medium. It will be recognized that such memory may be integrated with the controller or take any suitable configuration.

The memory 20 stores application code 25 that is executed by the processor 15. The application code 25 may further include application profile data 84, such as in headers of the code, identifying usage of portions, during code runtime, within the plurality of portions included in the processor 15. The application profile data 84 may provide usage information including which portions of the processor 15 are active or are idle during execution of the code, how frequently various portions are active/idle or accessed/not accessed, and parametric settings associated with various portions of the processor such as clocking frequency and power supply voltage settings for the relevant portions of the processor. The application profile data 84 is further defined and described below. The code 25 with application profile data 84 may be passed from the memory 20 to the processor 15 through the system bus 88, or any suitable link, for execution by the processor 15. For example, the application profile data 84 may be included with the code 25 as a header section. Alternatively, the application profile data 84 may be associated with the code using pointers or may be associated with the code by any means recognized by one skilled in the art.

The processor 15 may include a power management controller 80. The power management controller 80 evaluates header information of a data stream and varies parametric settings of portions of the processor 15 to reduce power consumption of the processor 15 based on the header information. In this example, the data stream includes executable code and header information that includes application profile data identifying which portions of the processor are exercised during runtime of the executable code. In an alternative or combined embodiment, the device processor 15 may include a video decoder, and the data stream includes encoded video. In such an example, described further below, the header information in the encoded video is used by the power management controller to determine which parametric settings of the video decoder are to be controlled. The encoded video stream need not include additional data, instead data inherent data in encoded streams (e.g., H.264, VC-1, MPEG or other encoded schemes typically include identifiers in the encoded data identifying the codec employed to encode the data stream) is used to determine how to control the video encoder to save power. Additional control data may be included in the stream if desired, but this can add additional data that may be undesirable in some instances.

Referring again to FIG. 1, The power management controller 80 is operative to control power consumption of processor portions based on the application profile data 84 and may be in any suitable form including but limited to executing software, dedicated circuitry or any suitable structure. The power management controller 80 may be operatively coupled to the system clock register 64, the main clock register 66 and the general purpose I/O 68. The crystal oscillator 45 generates an oscillator signal 90 that oscillates at a specific frequency based on the crystal 45. The oscillator signal 90 may be used by the PLL block 58 to generate a plurality of clock signals each of a specified frequency. For example, the system PLL 60 may generate a system clock (SCLK) 84 that may be used to synchronize operations in the 2D engine 52 and the 3D engine 54. Meanwhile, the memory PLL 62 may generate a memory clock (MCLK) 94 that is used to synchronize operations of the memory controller 56. The system PLL 60 may be adapted to generate the SCLK 92 with various frequencies. To select a specific frequency to change power consumption of the device based on the profile information 84, the power management controller 80 writes a system clock program value (SCLK PROG) 96 into the system clock register 64. The system clock register 64 generates a system clock frequency (SCLK FREQ) 98 that is used as the frequency selection input to the system PLL 60. Similarly, the memory PLL 62 may be adapted to generate the MCLK 94 with various frequencies. To select a specific frequency, the power management controller 80 may write a memory clock program value (MCLK PROG) 102 into the memory clock register 66. The memory clock register 66 generates a memory clock frequency (MCLK FREQ) 104 that is used as the frequency selection input to the memory PLL 62. As a result, the power management controller 80 is operative to vary the clocking frequencies of several portions of the processor 15, such as the 2D engine 52, the 3D engine 54, and the memory controller 56 or any other desired portions of the processor.

The power supply voltage input 72 may be operatively coupled to the processor 15 to provide a voltage supply for operating the processor 15. A plurality of such power supply voltage inputs 72 may be used to provide a plurality of separate adjustable voltage supplies for different portions of the processor 15. The power supply voltage input 72 may be operatively coupled to the output 73 of the voltage generator 50. The voltage generator 50, in turn may be coupled to and controlled by a power supply set signal 106 from processor 15. For example, the power management controller 80 may write a power supply program value 108 to the general purpose I/O 68. The general purpose I/O 68, in turn may generate the power supply set signal 106. As a result, the power management controller 80 is operative to vary the power supply voltage of the processor 15 or of several portions of the processor 15, such as the 2D engine 52, the 3D engine 54, and the memory controller 56. While not shown, a similar approach may be used to allow the power management controller 80 to vary transistor back bias voltages for portions of the processor 15 using known transistor back biasing techniques if desired.

It is known that power consumption in a processor may be altered by altering parametric values such as clocking frequency, power supply voltage, or transistor back biases. For example, reducing clocking frequency, reducing the operating power supply voltage, or increasing the transistor back bias voltage are known to reduce power consumption during runtime. However, these parametric changes, such as reducing clock frequency, may also reduce the operating speed of the processor or portions thereof. Therefore, to reduce power consumption while minimizing the effect on performance, it is useful to only affect the operating parameters of portions of the processor that are not in use or that are minimally used. The power management controller 80 may therefore be adapted to use the application profile data 84, where the usage, in the running of application 25, of various portions of the processor is provided along with the application code 25, to selectively adjust the parametric settings of identified portions of the processor 15. For example, if a particular portion of the processor, such as the 2D engine 52, is not active or not used in the execution of application 25, as indicated by the application profile data 84, then the power management controller 80 may simply turn OFF the 2D engine 52 during runtime of the application code 25, prior to the runtime of application code 25 or during the initialization of application 25. Alternatively, the power management controller 80 may reduce the clocking frequency of SCLK 98 to reduce the power consumption of the 2D engine 52. Alternatively, the power management controller 80 may reduce the value of the power supply voltage 72 for the 2D engine 52 to reduce the power consumption of the 2D engine 52. Of course, reducing the clock frequency of SCLK 98 to zero or reducing the power supply voltage 72 to zero may effectively reduce power consumption to near zero. If the 2D engine 52 is not used in the application code 25, then this approach may be optimal for reducing power consumption. Alternatively, if a portion, such as the memory controller 56 is used in the application, but only sporadically, then the power management controller 80 may be adapted to only reduce the clock frequency of MCLK 94 or the power supply voltage 72, or both, to the memory controller 56. The power consumption of the memory controller 56 is thereby reduced. The speed of operation of the memory controller 56 that supplies memory control signals 110 for accessing the additional memory 40 may be reduced while maintaining sufficient functionality to support the operation of the processor 15. Similarly, the transistor back bias may be varied under the control of the power management controller 80 to increase or to reduce the power consumption of a portion of the processor 15.

The application profile data 84 may be supplied to the memory 20 in various ways. For example, the application code 25 and application profile data 84 may be written into memory 20 during the manufacture of the battery-powered device 10. Alternatively, the application code 25 and application profile data 84 may be written into memory 20 at a later time. For example, the application code 25 and application profile data 84 may be supplied through a wireless data link using the transceiver 30 and the controller 35. The application and application profile data 112 may be downloaded from a wireless network through the transceiver 30. In this example, the application and application profile data 114 is then transmitted through the controller 35, and the application and application profile data 114 is stored in memory 20. Alternatively, the application profile data 84 may be supplied independent of the application code 25.

The idle register 70 may generate idle bits 118 that may be read from the processor 15 to monitor the activity of the various portions of the processor 15. For example, the idle register 70 may generate bit patterns that indicate which portions of the processor 15 are active or inactive during execution of the application code 25. By logging the idle bit values 118, the application profile data 84 identifying portion usage may be derived.

Figure 2:
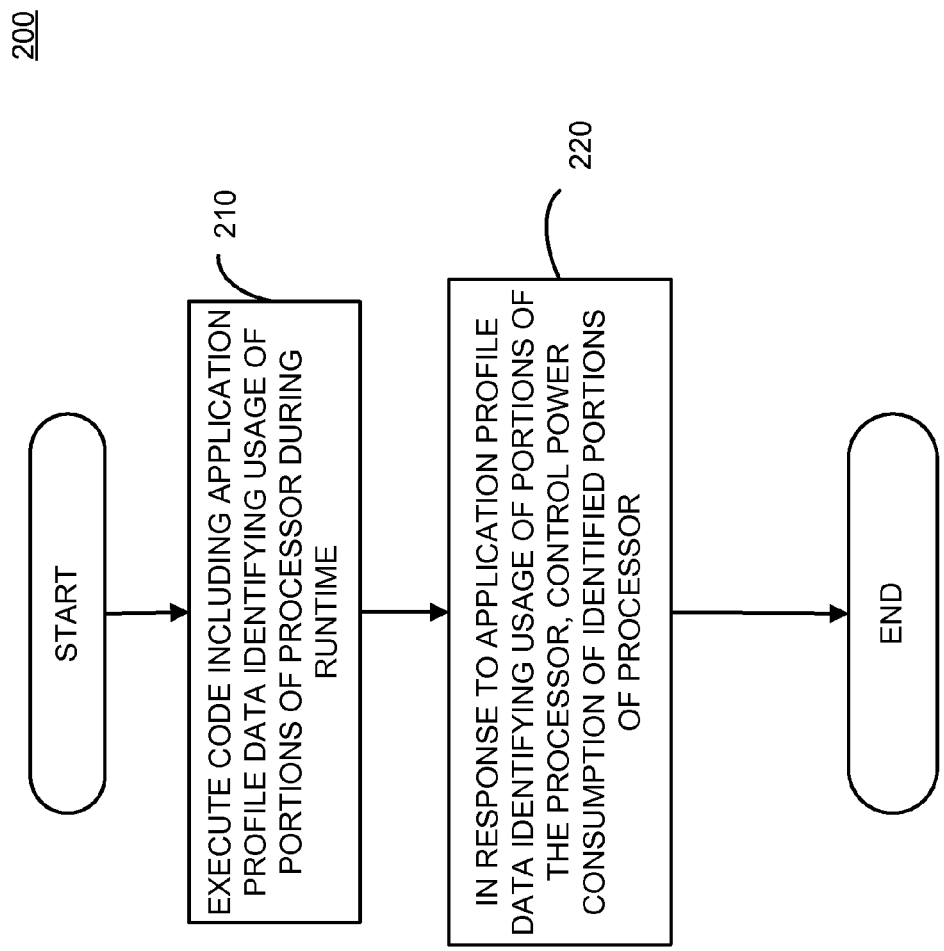
FIG. 2 is one example of a method of controlling power consumption depicting one embodiment of the invention.

FIG. 2 is one example of a method 200 of controlling power consumption depicting one embodiment of the invention. In step 210, the processor 15 of the battery-powered device 10 executes code 25 including application profile data 84 identifying usage of portions of the processor 15 during application runtime, prior to runtime or during initialization of the application. In step 220, in response to the application profile data 84, the power management controller 80 controls power consumption of the identified portions of the processor 15. As a result, the power consumption in the processor 15 is reduced.

Figure 3:
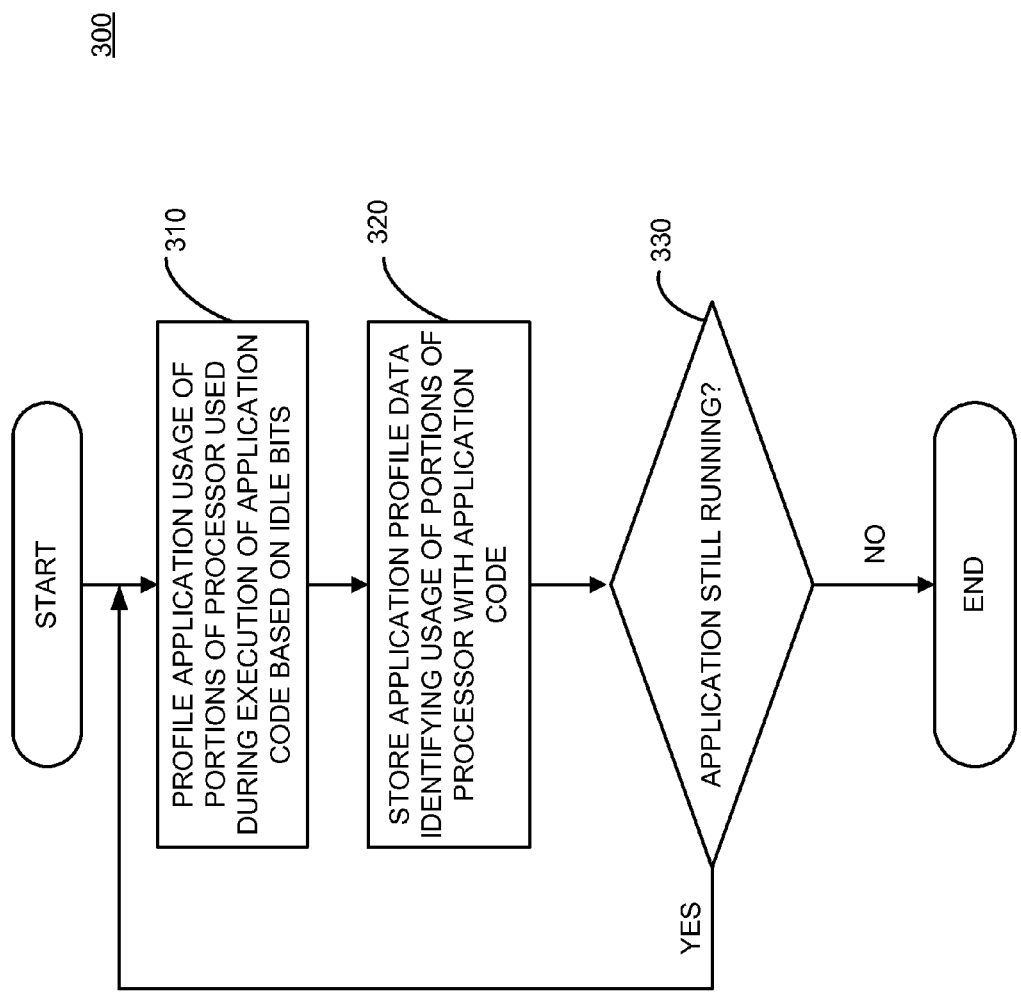
FIG. 3 is one example of a method of determining identifying data for use in controlling power consumption depicting one embodiment of the invention.

FIG. 3 is one example of a method 300 of determining application profile data for use in controlling power consumption depicting one embodiment of the invention. In step 310, the application is profiled to determine portions of the processor 15 used during the execution of the application code 25 based on the idle bits 118 of the idle register 70. In step 320, the application profile data 84 identifying the used portions of the processor 15 are stored or otherwise associated with the application code 25. In step 330, if the application 82 is still running, the application continues to be profiled to identify processor portions and to store profile application data.

Figure 4:
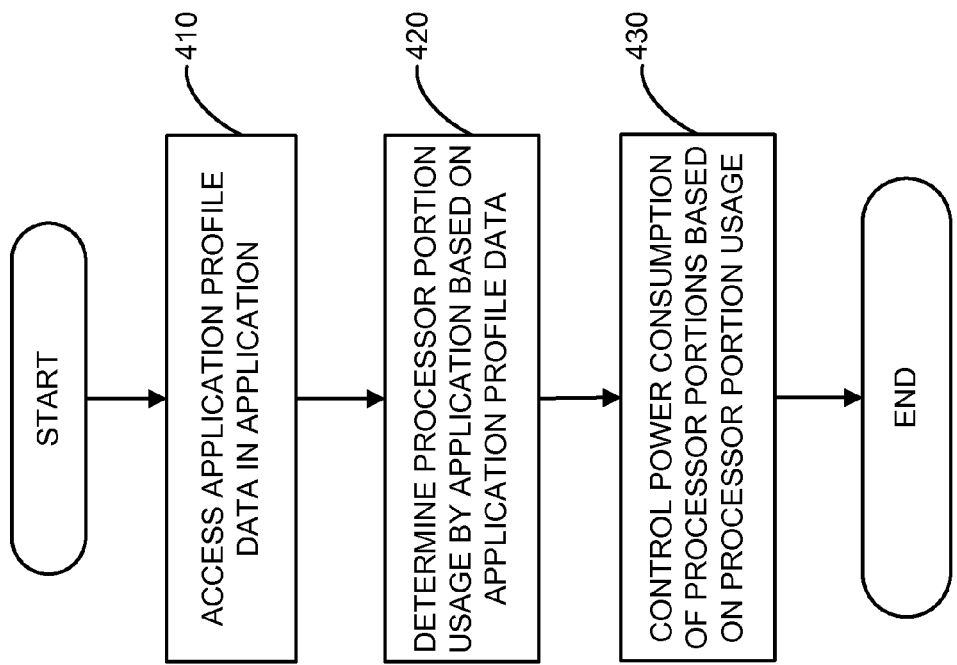
FIG. 4 is one example of a method of controlling power consumption depicting one embodiment of the invention.

FIG. 4 is one example of a method 400 of controlling power consumption depicting one embodiment of the invention. In step 400, the application profile data 84 is accessed by the processor 15. For example, the application profile data 84 may be included as a header portion associated with or incorporated into the application code 25 that may be accessed by the processor 15 via the system bus 86. In step 420, the usage of portions of the processor 15 is determined by the processor 15 based on the application profile data 84. In step 430, the processor controls the power consumption of portions of the processor 15 based on the processor portion usage. For example, the power management controller 80 may control clock frequencies 92 and 94 or supply voltages 72 to thereby control the power consumption of the processor portions.

Figure 5:
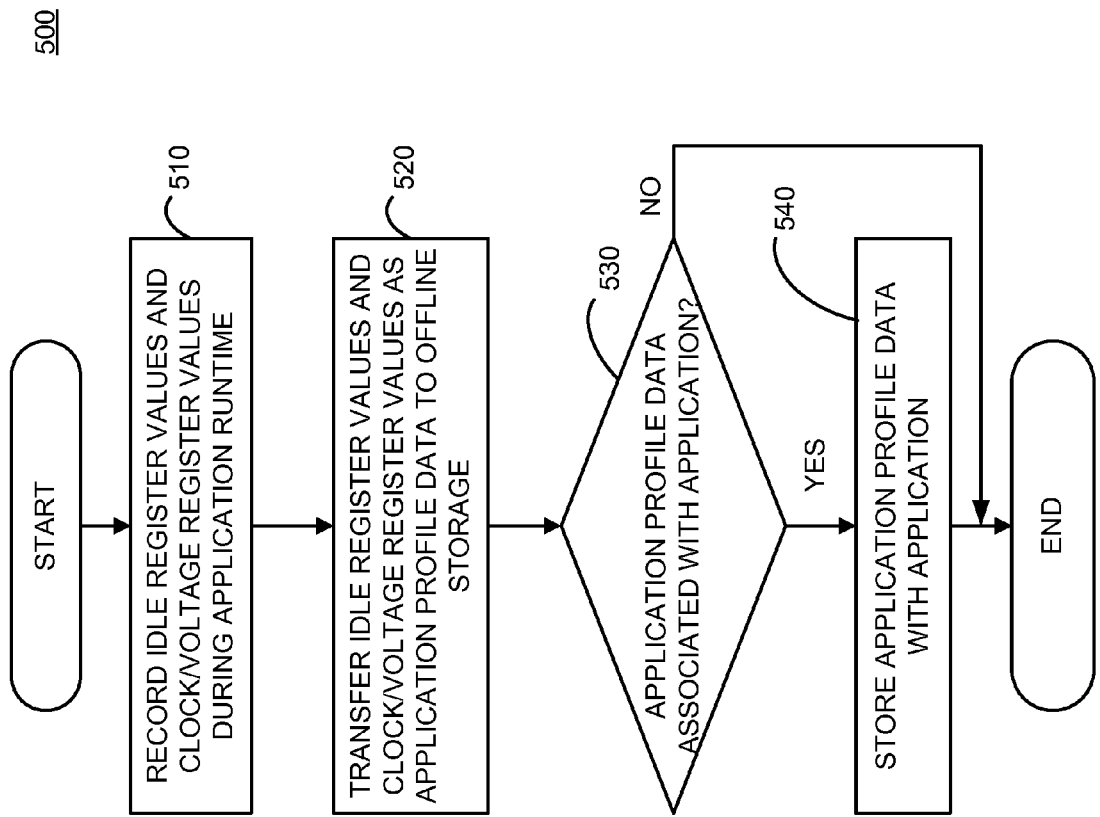
FIG. 5 is one example of a method of determining identifying data for use in controlling power consumption depicting one embodiment of the invention.

FIG. 5 is one example of a method 500 of determining application profile data 84 for use in controlling power consumption depicting one embodiment of the invention. A method 500 of prior determination and storage of the application profile data 84 is shown. In step 510, the parametric settings of the idle register 70, of the clock registers 64 and 66, and of the voltage registers 68 are recorded during application runtime. The parametric settings, such as clock frequencies and supply voltages, of portions of the processor may thereby be associated with idle register values at the same time. The resulting application profile data 84 includes both active/inactive status and parametric values for the various portions. In step 520, the idle register 70 values and the clock register 64 and 66 and supply voltage register 68 values are transferred to offline storage as application profile data 84. In step 530, if the application profile data 84 is to be associated with the application, the application profile data 84 is stored with the application 25 in step 540.

Figure 6:
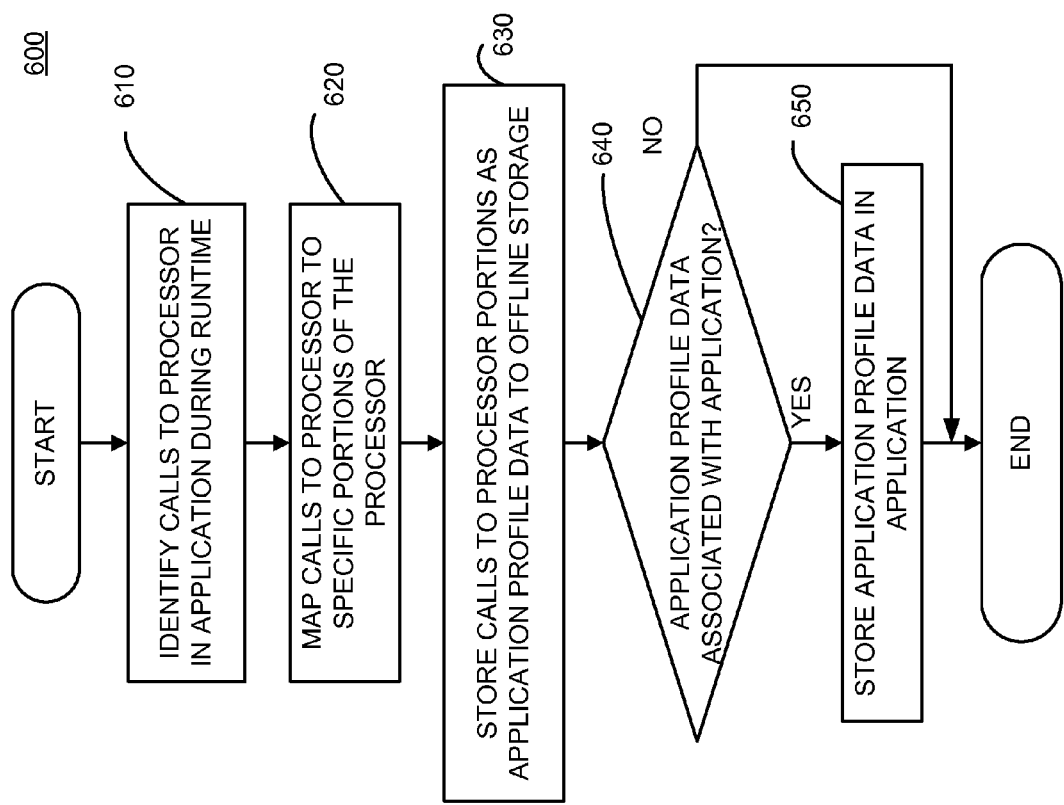
FIG. 6 is one example of a method of determining identifying data for use in controlling power consumption depicting one embodiment of the invention.

FIG. 6 is one example of a method 600 of determining identifying data for use in controlling power consumption depicting one embodiment of the invention. Another method 600 of prior determination and storage of the application profile data 84 is shown. In step 610, calls to the processor 15 are identified during execution of the application code 25. In step 620, the calls to the processor 15 are mapped to specific portions of the processor. For example, calls to the processor 15 may be mapped to the 2D engine 52 or to the 3D engine based on the type of call. In step 630, the calls to portions of the processor 15 are stored. In step 640, if the application profile data 84 is to be associated with the application, the application profile data 84 is stored with the application 25 in step 650.

Figure 7:
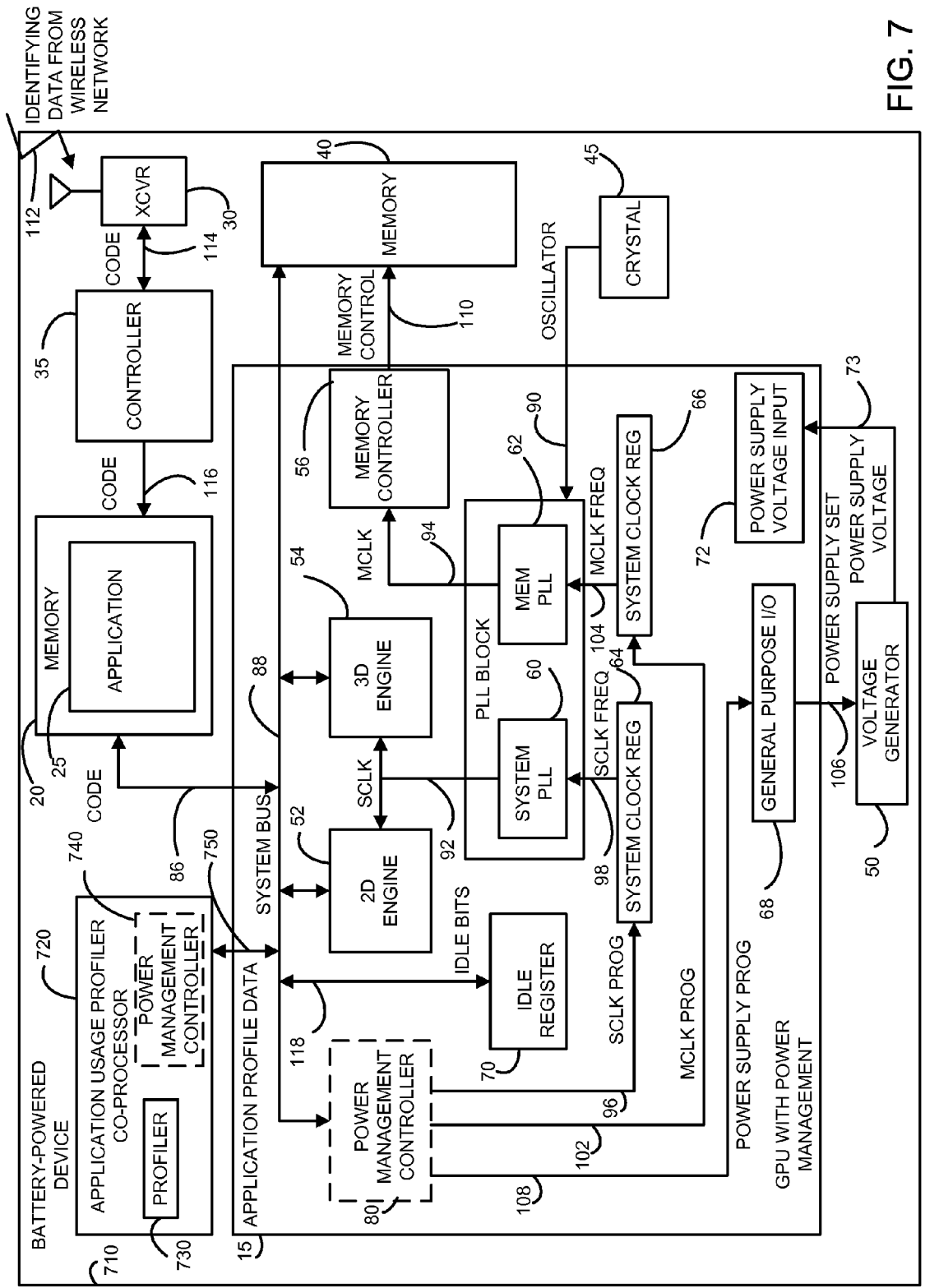
FIG. 7 is one example of a battery-powered device depicting one embodiment of the invention.

FIG. 7 is one example of a battery-powered device 710 depicting one embodiment of the invention. In this example, the battery-powered device 710 includes an application usage profiler co-processor 720. The application usage profiler co-processor 720 includes a profiler 730 and may further include a power management controller 740. The application usage profiler co-processor 720 is operatively coupled to the memory 20 and the processor 15 through, for example, the system bus 88. The application usage profiler co-processor 720, for example, may be a digital signal processor (DSP), microcontroller, central processing unit, baseband processor, co-processor, or any suitable processing device. In addition the application usage profiler co-processor 720 may be discrete logic, or any suitable combination of hardware, software or firmware or any suitable structure. The profiler 730 determines the application profile data 750 during runtime of the application 25. For example, while the processor 15 executes the application code 86, the profiler 730 of the application usage profiler co-processor 720 may record register values in the processor 15 to determine application profile data associating usage of processor portions with the code execution as described in reference to FIG. 5, described above. Alternatively, the profiler 730 of the application usage profiler co-processor 720 may identify calls to specific processor portions as described in part of FIG. 6 described above.

The application usage profiler co-processor 720 may include a power management controller 740. In this case the power management controller 80 of the processor 15 is not needed. The power management controller 740 performs the same functions as the power management controller 80 on the processor 15 of FIG. 1 as described above. However, communication to registers 64, 66, and 68 of the processor 15 may be through the system bus 88. Alternatively, the power management controller 80 may remain in the processor as in FIG. 1 in which case the power management controller 740 may not be included in the application usage profiler co-processor 720.

In another embodiment, the wireless device may be sent the application and application profile data via a wireless network so that the wireless device may suitably download the application profile data and corresponding application as desired. In this embodiment, a network element, such as a base station, server containing suitable memory, or any other suitable structure may store and provide the application profile data and corresponding application information in memory and through a processor or other suitable controller, wirelessly send the application profile data and application to the wireless device via the network. Upon receipt of the sent application profile data and application, the mobile device may then operate as described herein to utilize the application profile data and execute the application.

In addition, the mobile device when communicating with the network element may provide, for example, a mobile device identifier. The network element may then select an appropriate application and corresponding application profile data based on the mobile device identifier to provide a proper profile application data set and application based on a mobile device type. For example, different mobile devices may have different processor capability, and hence, although they may execute the same application, the functional capabilities of the device may be different depending upon processor speed, other peripheral circuit limitations so that application profile data may be specific to a mobile device type and may be different among different mobile device types even though the same application may be executable on different types of mobile devices. The network element as noted above may be any suitable structure including, but not limited to, a server that employs one or more processors memory and network interface circuitry operative to send and receive information via one or more networks. Any suitable network interface may be used depending upon the type of network being employed. Where the network element is a base site controller, the network element may also include an antenna structure operatively coupled to the network interface to allow for wireless communication of the application profile data and the executable code to the mobile device. Alternatively, where the network element is a network server that does not couple with an antenna structure, such as an Internet server or any other suitable server, the network element may communicate to a wireless transmitter to wirelessly transmit the appropriate application profile data and corresponding executable code as desired.

In another embodiment, an integrated circuit fabrication facility can produce circuits that carry out the operation described herein using stored code to cause a processor to operate as described herein. For example, an integrated circuit design or fabrication system (a workstation or other system that has processors, memory and other conventional structure as known in the art) that uses Verilog information, GDS-II information or any other suitable circuit specification information may access a computer readable storage medium such as any suitable memory that stores circuit configuration information that causes a processor (one or more) in the integrated circuit design system to produce integrated circuits that operate as described herein. For example, the computer readable medium that stores instructions (code that causes a circuit to be configured) which when executed adapt a device to execute code that includes application profile data identifying usage of portions of a first processor during runtime of an application; and in response to the application profile data identify usage of portions of the first processor, controlling power consumption of the identified first processor portions during runtime. The computer readable medium may also include instructions which when executed adapt the device to control power consumption by varying parametric settings of the identified portions, wherein the parametric settings include at least one of clocking frequency, power supply voltage, and transistor back bias voltage.

Accordingly, many advantages of the above illustrated described structure will be recognized by those ordinary skilled in the art. For example, power can be proactively and automatically conserved prior to significant battery discharge and without operator intervention. Application profile data included in a stream or associated with a stream indicates which parts of a processor in the device may be unused during operation of an application executing on the processor. In response to the application profile data, portions of the processor are automatically identified for power control and power is conserved by adjusting parametric settings, such as clocking speeds, supply voltages, or transistor back biases, in the relevant processor portions. Application profile data may be determined prior to runtime of the application or during runtime. The power control technique is useful for conserving battery power consumed by the processor or other components in a wide variety of battery-powered devices. Typically while profiling, the device may adaptively adjust parameters in the system based on feedback from idle bits, memory controller congestion feedback, and other resource-utilization-feedback. This is most easily done for clock frequency adjustment, and, to some degree, voltage adjustment, to keep the system working properly and avoiding slow-downs. The disclosed methods and apparatus allows for longer term power optimization with less system impact by leveraging run-time profiling—for example elements can be powered down saving leakage without worrying about the context-restore (wake-up) delay (which can be large) since it is known apriori that a given application will not call upon these resources due to the run-time profiling that was done. It will be recognized that adaptive voltage/frequency/back bias control can also be used on those elements that are used to further conserve energy. Other advantages will be recognized by one of ordinary skill in the art.

Figure 8:
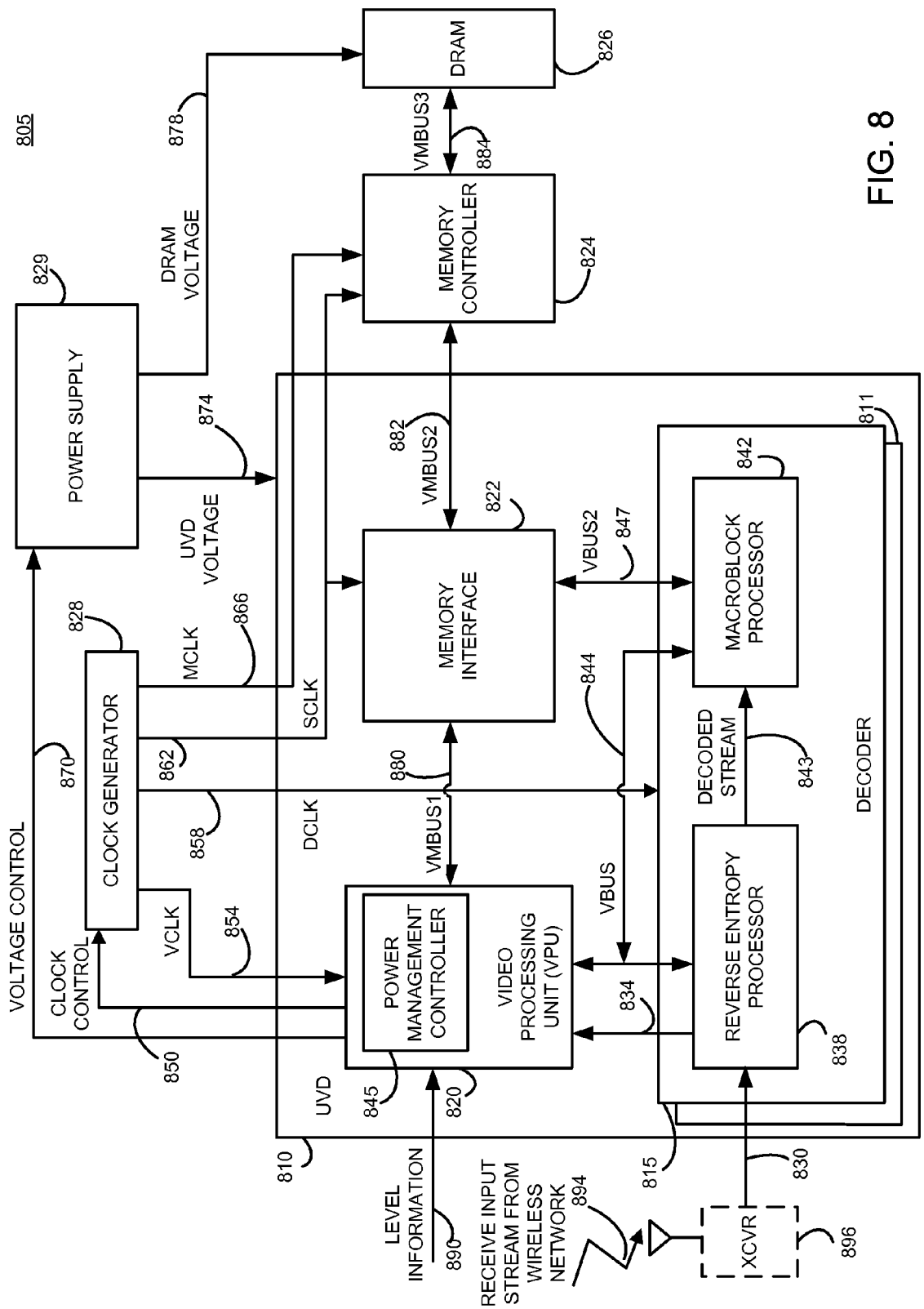
FIG. 8 is one example of a video decoding system depicting one embodiment of the invention.

In another embodiment, a video decoder is disclosed. FIG. 8 is one example of a video decoding system 805 depicting one embodiment of the invention. The system 805 includes a video decoder 810. The video decoder 810 may be used to decode video stream data in any of a wide variety of devices including handheld devices, non-handheld devices, a wireless devices, non-wireless devices, battery-powered devices and non-battery-powered devices. The video decoder 810 may be included, for example, in a telephone, a personal computer, a digital assistant (PDA, SDA, MDA), a digital entertainment/playback device, a radio communication device, a tracking device, a personal training device, a global positioning device, a camera, a video recorder, a video game controller, a television receiver, a digital video player, a digital display, any combination thereof or in any other suitable device or system.

The video decoder 810 may be a universal video decoder (UVD) capable of decoding compressed video in multiple different formats such as MPEG, MPEG-2, MPEG-4, VC-1, AVC or other desired formats. The video decoder 810 may be compatible with the compressed video format H.264 and with high definition video formatting such as is used on HD-DVD, Blu-Ray disc (BD-ROM), and HD-TV. The video decoder 810 includes a decoder 815 and a controller such as a processor 820 (also referred to as a video processing unit) operatively coupled to the decoder 815. The video decoder 810 may be any suitable video decoder and in this example employs an embedded CPU also referred to as video processing unit which can be programmed for a needed encoding scheme and hardware blocks that are dedicated to certain encoding schemes (see FIG. 12). The video decoder 810 may further include a memory interface 822 operatively coupled to the processor 820. The video decoder 810 may be further coupled to memory controller 824 that is further coupled to a memory 826 as known in the art. The video decoder 810 may be further operatively coupled to a clock generator 828 and a power supply 829. The video decoder 810 may be made up of several operational portions, or functional blocks. The operational portions provide or control functions contributing to the function of the overall video decoder 810. For example, the video decoder 810 may be made up of operational portions such as the decoder 815, the processor 820, the memory interface 25, or other portions as are known in the art. Separate power supply voltages or clock signals may be connected to the operational portions.

The decoder 810 is operative to receive an input stream 830 and to determine encoding description data 834 from the input stream 830. The decoder 810 may include, for example, a reverse entropy processor 838 and a macro block processor 842. The decoder 810 may further include an inverse transformer or a motion compensator or an in-loop de-blocker or any combination thereof as one skilled in the art will understand depending upon the encoding type of stream being received. Other decoders 811 (dedicated hardware portions) may also be employed wherein different decoders are selected depending on the type of stream being received. The reverse entropy processor 838 may be operative to decode an input stream 830 that has been encoded via an entropy encoding scheme. The H.264 compressed video standard describes a variety of entropy encoding schemes. For example, context-based adaptive binary arithmetic coding (CABAC) may be used to increase compression efficiency over the prior standard under MPEG-2 of context adaptive variable length coding (CAVLC). Unfortunately, the increased compression efficiency achieved through CABAC encoding is more computationally demanding to decode than CAVLC. As a result, a CABAC encoded input stream requires more clocking cycles to decode than a CAVLC encoded input stream. Alternatively, to decode a CABAC encoded data stream at the same speed as a CAVLC encoded data stream, the video decoder 810 must operate at a higher clocking frequency. Unfortunately, it is well established that the power consumption of synchronous electronic devices increases as the clock frequency increases. Therefore, the video encoding/decoding scheme chosen may have an impact on power consumption and, by extension, battery life for a battery-powered device that employs the decoder 810.

Similar observations regarding power consumption differences between decoding requirements under H.264 may be made with respect to other optional encoding schemes available within the H.264 standard. For example, video pictures may be subdivided into slices which may be defined as basic spatial segments that are independent from their neighbors. As a result, errors or missing data from one slice should not propagate to any other slice within the picture. Slices may be defined in several ways as defined by slice types, such as I, P, and B frames as is known in the art. As another example, macro blocks may be used. It has been found that the addition of B-type slicing capability increases the computationally demands for the video decoder. For example, macroblock adaptive frame/field encoding (MBAFF) may be used as is known in the art. It has been found that the MBAFF decoding is computationally more demanding than decoding without MBAFF.

The reverse entropy processor 838 of the decoder 815 may be operative to determine encoder description data 834 from the input stream 830 such as profile data that describes the scheme used to encode the input stream 830. For example, the flags in the input stream 830 may provide information including the slice type (I, B, P), the MBAFF mode, and the CABAC mode. The encoder description data 834 may be determined by, for example, reading, or parsing, packet header information from the input data stream 830, may be in the body of packet information or may be obtained in any suitable manner. Slices contain groups of packets. For an H264 stream, system parameter set information, picture parameter information or sequence parameter set information or any combination thereof can be used, or any other suitable data. If header information or other desired information is encoded, the encoder description data 834 may be determined by decoding packet information from the input data stream 830. The reverse entropy processor 838 may further decode the input stream 830 to produce a decoded stream 843 that is received by the macro block processor 842 to process macro block data that is then transmitted to the processor 820 via a video bus (VBUS) 844 and to the memory interface 822 by VBUS2 847 as is known in the art.

Level information 890 may be received by the power management controller 845 and comes from a sequence parameter set which is a type of slice. For example, display resolution levels (i.e., 1920×1080 or 720×480), bit rate levels, and frame rate levels are provided to the power management controller 845.

The video decoder 810 may further be coupled to a wireless network via a wireless network interface 896. Input stream data 830 may be received by the wireless network interface 896 as a wireless network message 894. The decoder 815 may be made up of several operational portions, or functional blocks. The operational portions provide, or control, functions contributing to the functioning of the overall decoder 815. For example, the decoder 815 may be made up of operational portions such as the reverse entropy processor 838, the macroblock processor 842, or other portions as are known in the art. Separate power supply voltages or clock signals may be connected to the operational portions.

The video processor 820 is operatively coupled to the decoder 815. For purposes of illustration only, the video processor 820 is shown as a video processor unit (VPU). However, circuits or processors of other types, architectures, and capabilities may be used as will be recognized by one skilled in the art. For example, a digital signal processor (DSP), microcontroller, central processing unit, baseband processor, co-processor, or any suitable circuit or processing device may be used. As such, the video processor 820 may be discrete logic, or any suitable combination of hardware, software or firmware or any suitable structure. The video processor 820 may further include arithmetic units, on-chip memory, address decoders and encoders, video decoders and encoders, co-processors, and other portions as are known in the art. The video processor 820 may be operatively coupled to the memory interface 822 via video memory bus (VMBUS1) 880. The memory interface 822 may further be operatively coupled to the memory controller 824 via another video memory bus (VMBUS2) 882. The memory controller may be operatively coupled to the video memory 826 via another video memory bus (VMBUS3) 884.

The video processor 820 includes a power management controller 845. The power management controller 845 may be software, such as a driver, executed by the video processor 820 or may be a circuit implemented in the processor 820. The power management controller 845 receives the encoding description data 834. The power management controller 845 selects one of a plurality of different power consumption states for the video decoder 810 in response to the determination of the encoding description data 834. Further, in response to the determination, the power management controller 845 varies the power consumption of at least one operational portion of the video decoder 810. The power management controller 845 controls the clock generator 828 and power supply 829. Alternatively, the video processor 820 may receive the encoding description data 834 and select one of a plurality of different power consumption states for the video decoder 810 and then command the power management controller 845 to further control the clock generator 828 and power supply 829. For example, as described above, the various encoding/decoding schemes available within the H.264 standard effect power consumption to various decrees. To meet performance requirements, such as decode latency, for each decode scheme while otherwise minimizing power consumption, the power management controller 845 may select between various pre-defined operating parametric values. Power consumption of the processor, decoder and memory controller may be altered by altering these parametric values, such as clocking frequency, power supply voltage, or transistor back bias, using a power consumption look up table or other mechanism. For example, reducing clocking frequency, reducing the operating power supply voltage, or increasing the transistor back bias voltages are controlled to reduce power consumption during runtime. However, these changes to parametric values, such as reducing clock frequency, may also reduce the operating speed of the video decoder 810.

The power management controller 845 is coupled to the clock generator 828 via a clock control signal 850. The power management controller 845 varies the clocking frequency of any of the clock generator 828 outputs such as, for example, the video processor clock (VCLK) 854, the decoder clock (DCLK) 858, the system clock (SCLK) 862, or the memory clock (MCLK) 866. The power management controller 845 is coupled to the power supply 829 via a voltage signal 870. The power management controller 845 varies the supply voltage of any of the power supply 829 outputs such as, for example, the universal video decoder (UVD) voltage 874 or the DRAM voltage 878. Similarly, the power management controller 845 may be used to control transistor back bias voltages in operational portions of the video decoder 810 to thereby control power consumption. Referring now to TABLE 1, a power management control table shows an example where different power consumption states are associated with various encoding schemes and slice types. Examples of clock frequency control based on features of the input bitstream (H.264) is shown. The "adaptive" term means the value that is appropriate for a given output resolution of decoded video. The "medium", "high", "low", etc. values can be adjusted dynamically based on average decode time of a frame of video.

performing some special effect instead of regular decoding, the power consumption requirements are modified. For example when in "pause" mode, the decoder is not very active and the clocks frequency are lowered and supply voltages to circuits are also lowered as well.

Figure 9:
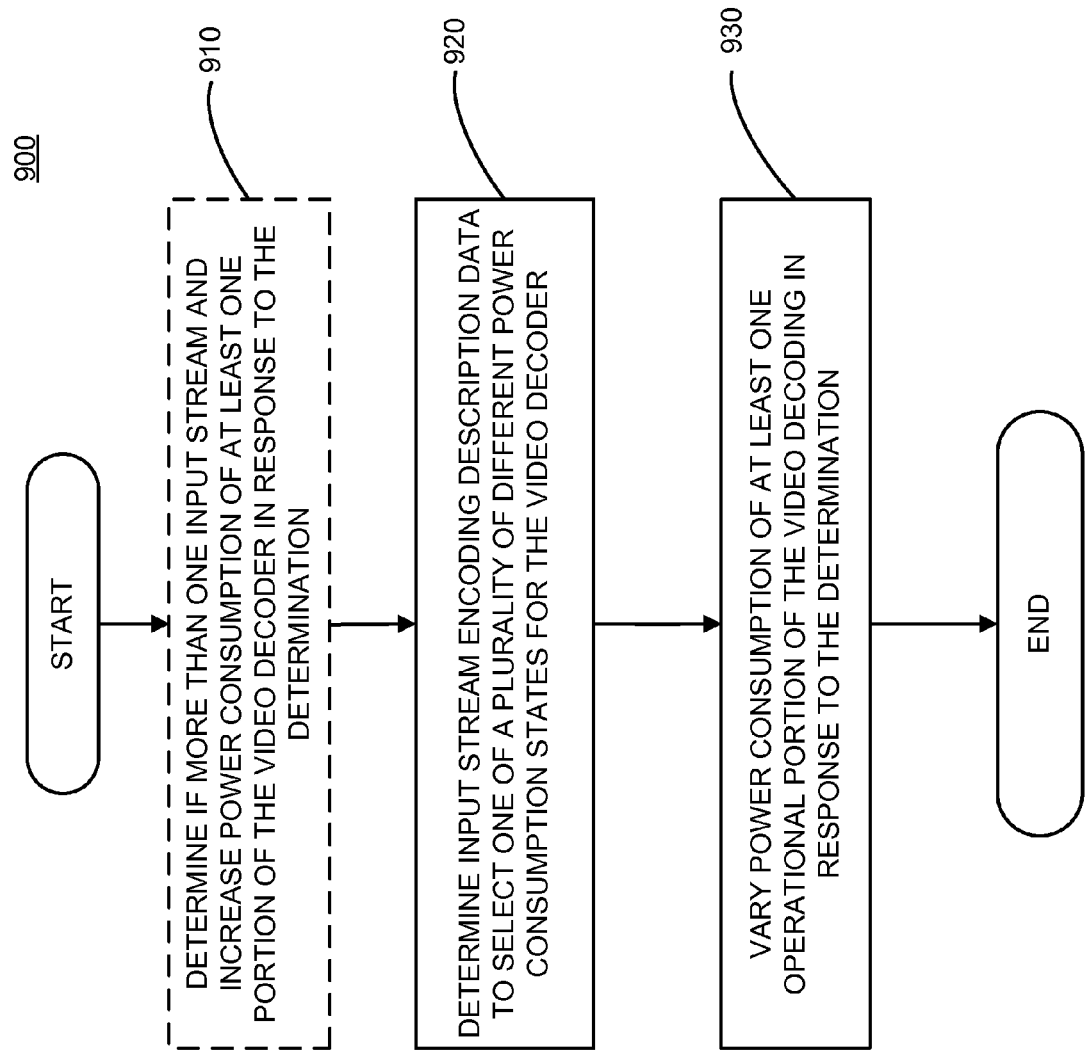
FIG. 9 is one example of a method of controlling power consumption depicting one embodiment of the invention.

FIG. 9 is one example of a method of controlling power consumption 900. Step 910 is an optional step in which, video decoder 810 determines if there is more than one input stream and increases the power consumption of at least one operational portion of the video decoder 810 in response to the determination of the encoding description data 834. For example, if there are multiple input streams being received, the clock frequency and supply voltage for the decoder and supporting circuitry is increased if it is not already at the desired level. In step 920, the power management controller 845 determines input stream encoding description data 834 to select one of a plurality of different power consumption states for the video decoder 810. For example, if the encoding description data 834 indicates that a slice type of "I" with a low bit stream rate, then a power consumption state is selected where the video clock (VCLK) is at a medium frequency, the decoder clock (DCLK) is at an adaptive frequency, and the memory clock (MCLK) is at a lowest frequency. In step 930, the power management controller 845 varies power consumption of at least one operational portion of the video decoder 810 in response to the determination, such as by varying clock frequencies and/or supply voltages per TABLE 1.

Figure 10:
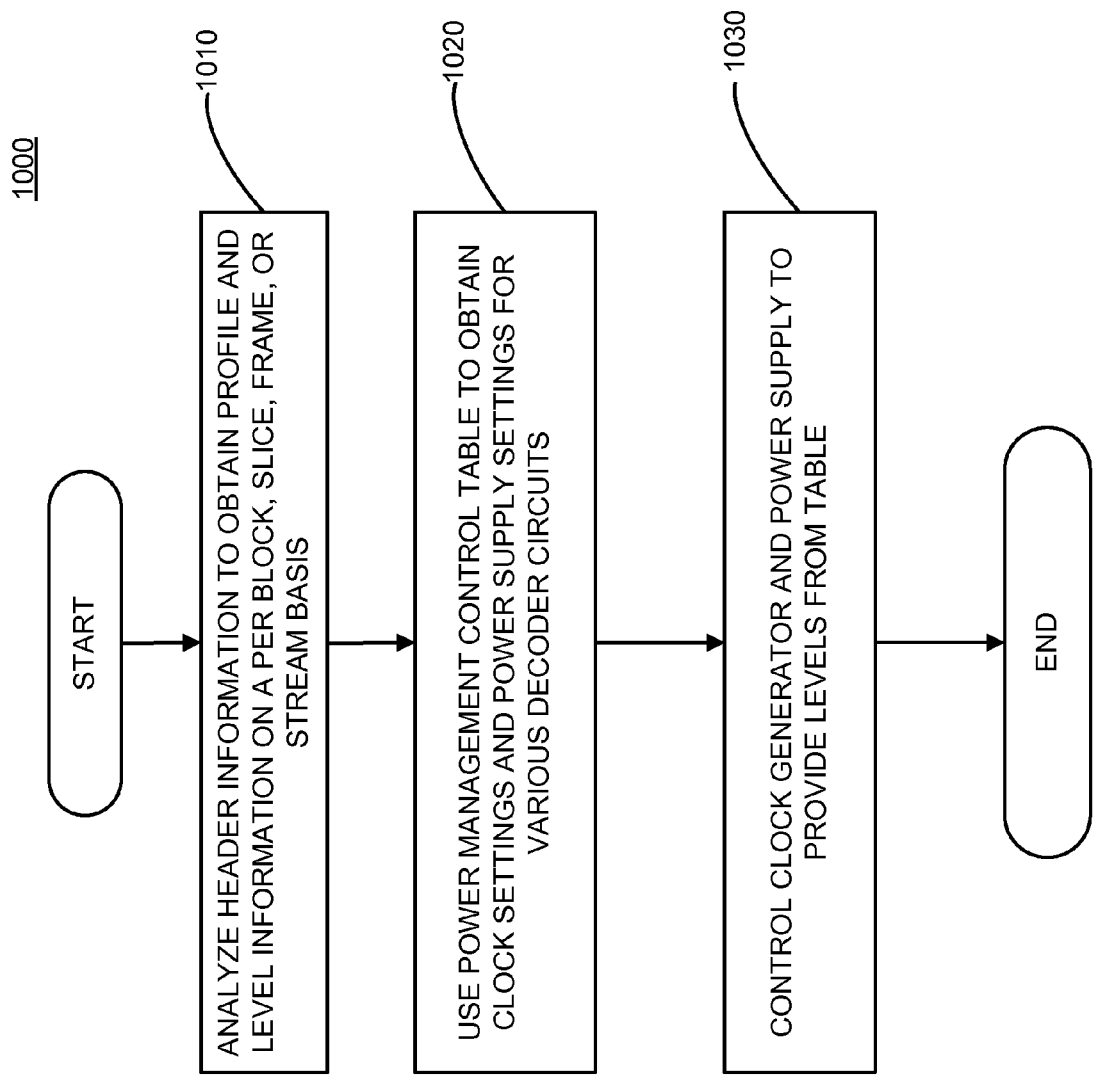
FIG. 10 is one example of a method of controlling power consumption depicting one embodiment of the invention.

FIG. 10 is one example of a more detailed method of controlling power consumption 1000 that assumes that the input stream is of an H.264 type. In step 1010, the decoder 815 analyzes packet header information to obtain profile and level information on a per block, slice, frame, or stream basis. In

TABLE 1

| Slice Type | MBAFF | CABAC | Bit stream rate | SCLK | VCLK | DCLK | MCLK |
|---|---|---|---|---|---|---|---|
| I | 0 | 0 | low | lowest | medium | adaptive | lowest |
| B | 0 | 0 | low | high | medium | highest | highest |
| P | 0 | 0 | low | medium | medium | Lower than last B slice | Half of last B slice |
| — | Yes | 0 | low | no change | high | no change | no change |
| — | 0 | Yes | low | no change | high | no change | no change |
| — | 0 | Yes | high | no change | highest | no change | no change |
| — | Yes | Yes | low | no change | high | no change | no change |
| — | Yes | Yes | highest | no change | highest | no change | no change |

As illustrated for example, if the encoding is I-type slice with a low bit stream rate, then VCLK 854 is set to medium, the DCLK 858 is set to adaptive, and the MCLK 866 is set to lowest. The "highest" designation refers for example to the highest frequency the clock is capable of performing at, while "lower than B slice" and "half of last B slice" refers to as the power controller regulates it learns about the particular bitstream that is being decoded, so it remembers what clock frequencies were used during the last "B-slice" (and other slices as well)—and it regulates at later times based on previous operation.

Also power management may be "workload based." The decode time of every frame is measured and if it is too short, some of the clocks are determined to be running too fast and their frequency should be lowered. In particular the idle time of functional blocks can be measured and the results can be used to regulate clock frequencies. Power management can also be "special effects based." When the decoder system is step 1020, the power management controller 845 uses the power management control table to obtain clock settings and power supply setting for various decoder circuits. In step 1030, the power management controller 845 controls the clock generator and power supply to provide levels specified by the power management control table.

Figure 11:
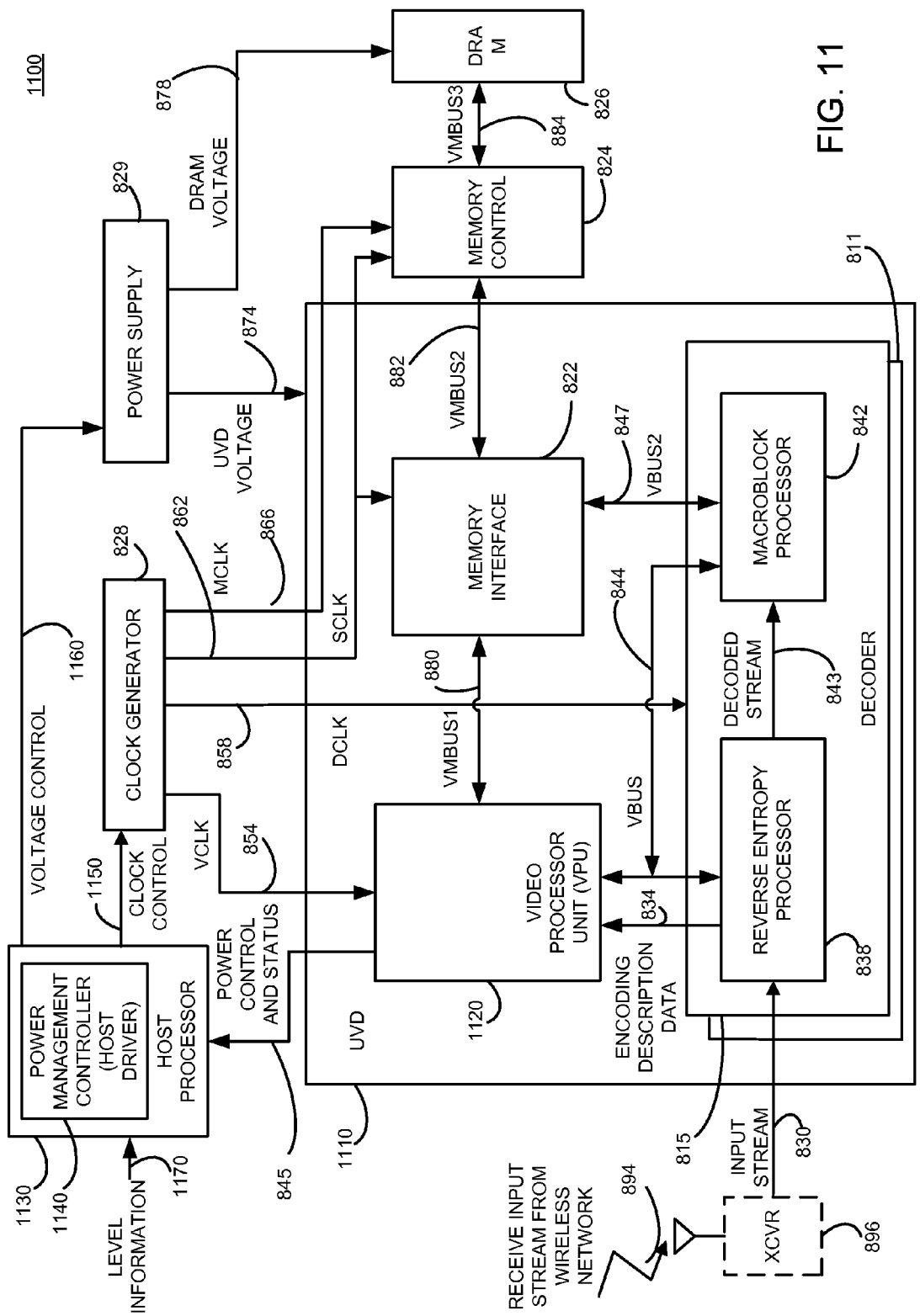
FIG. 11 is one example of a video decoding system depicting one embodiment of the invention.

FIG. 11 is another example of a video decoding system 1100. In this example, the video decoder 1110 includes a video processor unit (VPU) 1120 that does not include a power management controller. Rather, a coprocessor 1130 (such as a host processor core) including a power management controller 1140 (e.g., software executed by the coprocessor) is included in the system 1100. The power management controller 1140 may be included as a host driver 1140 executing on the host processor 1130. In this example, the video processor unit 1120 receives encoding description data from the decoder 815 and determines power control and status 1145. The power control information is a combination of all of the extracted information from the input bitstream information that is subsequently used for controlling the power consumption. For example, it may include slice type, presence of CABAC flag (or MBAFF flag), bitstream bit rate, levels, etc. The status information is the current state (current row in the example table), history of values (the adaptive values, lowest, highest, etc.). In general, the FIG. 11 configuration is the configuration from FIG. 8 with the change that the power management controller is moved to outside processor unit.

The power management controller 1140 of the host processor 1130 receives the power control and status 1145 and selects one of a plurality of different power consumption states for the video decoder 1110 in response to the determination of the power control and status. The power management controller 1140 is coupled to the clock generator 828 and controls the clock generator via the clock control 1150 signal. The power management controller 1140 is coupled to the power supply 829 and controls the power supply 829 via the voltage control 1160 signal. The power management controller 1140 is coupled to the clock generator 828 and controls the clock generator 828 via the clock control 1150 signal. Level information 1170 may be received by the host processor 1130. For example, display resolution levels (i.e., 1920× 1080 or 720×480), bit rate levels, and frame rate levels are provide to the host processor 1130 via an operating system or via data supplied by a user via graphic user interface, or from any suitable source.

Figure 12:
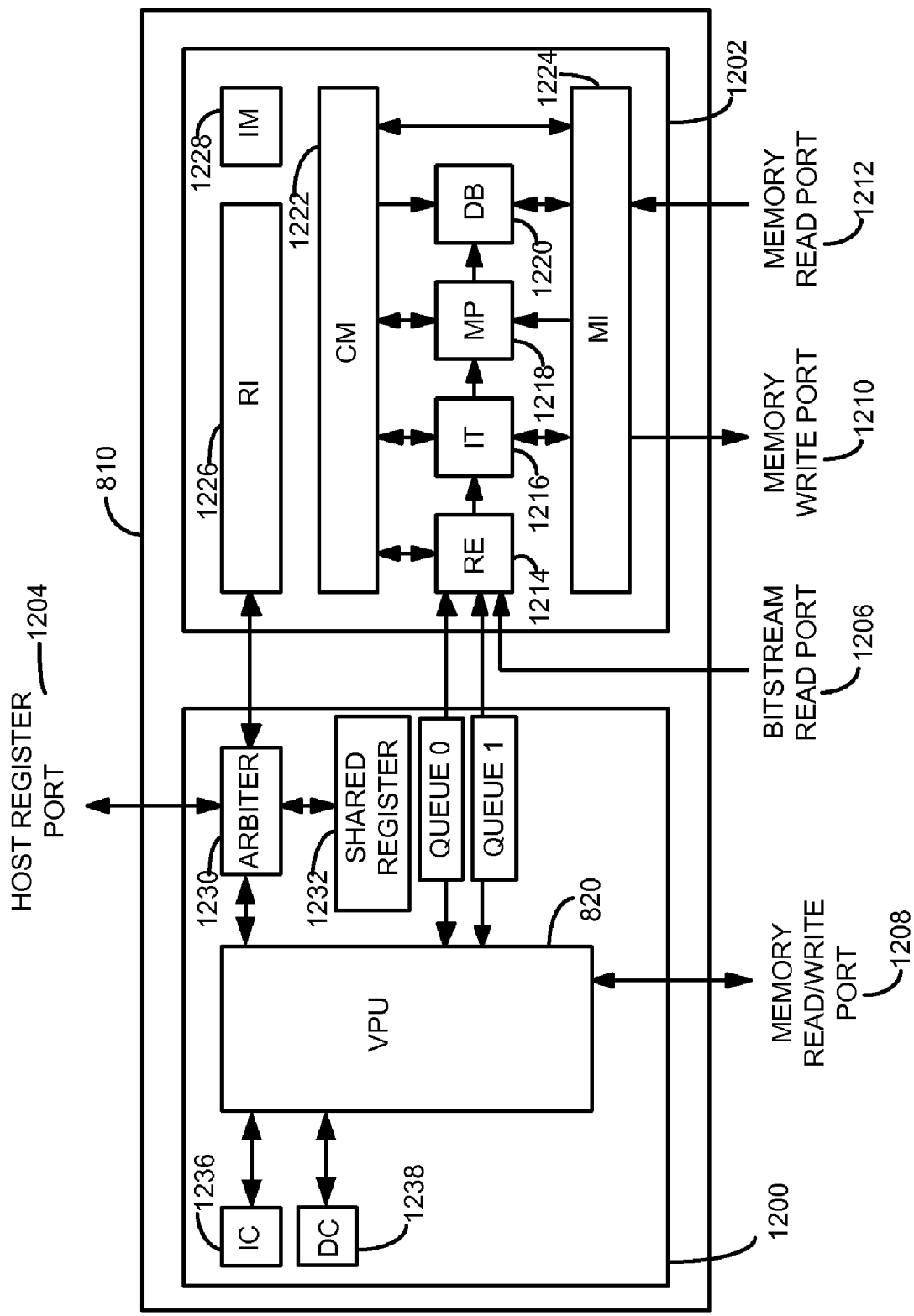
FIG. 12 is a block diagram illustrating one example of a decoder that can be controlled as described herein.

FIG. 12 illustrates one example of a video decoder 810 however it will be recognized that any suitable video decoder may be employed. In this example, the video decoder decodes H.264 in VC-1 input streams by performing decoding algorithms for use in such devices as computers, high definitions televisions and handheld devices. The video decoder 810 includes two portions shown as a processing portion 1200 and a hardwired portion 1202. The hardwired portion 1202 performs computationally intensive tasks, and the video processing unit 820 handles control functions. This can provide flexibility while allowing real time decoding. The video decoder interfaces to external integrated circuits, if desired (or internal if desired) using the interfaces shown such as a host register port 1204, a bit stream read port 1206, a memory port 1208 for the video processing unit 820, and memory write ports and read ports 1210 and 1212 for the hardwired portion 1202. Each of these interfaces has their own clock such as H clock, B clock, M clock respectively.

The host register port 1204 is used to communicate with a coprocessor such as a host processor. The host processor (not shown) configures shared registers 1232 and starts up the processor 820. Once the processor 820 is initialized, the host processor and the processor 820 communicate through arbiter logic 1230 using any suitable messaging protocol where, for example, general purpose registers and a shared register space maintain queues of messages in external memory. The video processor unit 820 can send interrupts to the host processor and vice versa.

The bit stream read port may be a 32 bit interface or any other suitably sized interface and is used to read in the input bit stream using, for example, a digital television proprietary protocol or any other suitable protocol. The protocol may allow for the bit stream to trickle into the decoder as data arrives into a coded picture buffer (CPB).

There are two 64 bit memory interfaces 1210 and 1212. The memory interface operates, for example, on 32 byte transfers but can support 16 byte transfers. It will be recognized that any suitably sized memory interface can also be used as desired. The processor 820 uses a combined memory read/write interface 1208 which allows the memory controller 824 to maintain memory coherency. The processor 820 in this example, has a 16 kbyte instruction cache 1236 and a 16 kbyte data cache 1238 with a 64 byte cache line which will translate into two 32 byte memory requests. However, any suitable configuration may be employed. A miss penalty for a cache miss could be long so it is desirable to employ firmware code so that there are no cache misses when the decoder is processing a macroblock layer.

The hardwired portion 1202 which is implemented using any suitable logic, uses separate read and write interfaces 1210 and 1212 for increased performance. Any coherency issues can be resolved by the decoder. In addition, data from memory is prefetched one macroblock before being used in order to prevent a pipeline from stalling due to memory latency.

The processor 820 communicates with the hardwired portion 1202 using a suitable register protocol with handshakes. The processor therefore can access the hardwired blocks as memory mapped devices. Each hardwired block has a command FIFO that can also be accessed through this register interface. The processor 820 controls the hardwired blocks by sending command packets on a macroblock basis. The command FIFOs provide some elasticity between the firmware and the hardwired logic, so that they can process different macroblocks. This can be desirable because the processing time for each macroblock may be variable depending upon the type of macroblock involved. Also the processor 820 can be configured with multiple queues that can be used to communicate asynchronously with the hardwired portion 1202. Even if the queues are blocked, the processor 820 can still handle interrupts.

The hardwired portion blocks, in this example include a reverse entropy block 1214, and inverse transform block 1216, a motion prediction block 1218, a D blocker block 1220, a context manager 1222, a memory interface 1224, register interface 1226 and an interrupt multiplexer 1228. As shown below, each of the blocks performs various operations as indicated.

reverse entropy
    read in bitstream
    H.264 CAVLC/CABAC entropy decoding
    H.264 residual block decoding
    VC-1 VLC decoding
    VC-1 residual block decoding
    VC-1 bitplane decoding
    PES parsing
inverse transform
    H.264 intra-prediction (16×16, 8×8, 4×4)
    H.264 inverse quantization
    H.264 inverse transform (8×8, 4×4)
    VC-1 intra-prediction (8×8)
    VC-1 inverse quantization
    VC-1 inverse transform (8×8, 8×4, 4×8, 4×4)
motion prediction
    H.264 motion vector calculation
    H.264 motion compensation (½ and ¼ pel interpolation)
    H.264 support for up to 16 reference frames/32 reference fields
    VC-1 motion compensation (½ and ¼ pel interpolation)
    VC-1 intensity compensation
    Optional cache for memory bandwidth reduction
deblocker
    H.264 deblocking
    VC-1 deblocking
    VC-1 overlap smoothing context manager
- centralize management of macroblock context information for udec_re, udec_it, udec_mp, udec_db
- store macroblock context to memory
- prefetch macroblock context from memory
- optimized context sizing for baseline, SD, HD modes
- support round-robin and priority-based arbitration
- write bitplane to memory Memory interface
- consolidate memory interfaces from udec_it, udec_mp, udec_db into 1 read client and 1 write client
- support round-robin and priority based arbitration Register interface
- provide register decoding to sub-blocks
- CRC generation on datapath data for debugging and diagnostics purposes Interrupt mux
- consolidate interrupts from sub-blocks into single interrupt The processor 820 performs initialization of the blocks, does parsing of the bit stream such as sequence, picture, slice, macroblock parsing, controls and coordinates hardware blocks through command FIFOs, communicates with the reverse entropy block through queue ports from the processor to extract symbols, performs VUI and SEI extractions, provides trick mode control, error handling and concealment, interrupt handling, communication with the host processor and audio/visual synchronization in addition to or instead of any other desired operations.

The operations described herein may also be carried out by one or more processing devices that execute instructions to perform the functions described herein. In such an embodiment, a computer readable medium such as any suitable digital storage medium may store instructions that when executed cause a processor to perform the operations described herein.

Many advantages of the above illustrated described structure will be recognized by those of ordinary skill in the art. A type of universal video decoder includes reduced power consumption. Power is proactively and automatically conserved prior to significant battery discharge and without operator intervention. Power consumption is varied in portions of the video decoder in response to encoding characteristics from an input data stream to minimize power consumption while achieving required performance. The encoding characteristics are preferably existing data that is already present due to encoding standards, but such data may also be added by an encoder if desired.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A battery powered device comprising:
a video processor comprising a power management controller that in response to a determination of video encoding scheme description data, is operative to vary power consumption of at least one operational portion of a video decoder.

2. The device of claim 1 comprising the a video decoder operative to receive an input stream and to determine encoding description data from the input stream wherein the decoder comprises a plurality of operational portions and wherein the power management controller is operative to select a power consumption state to vary power consumption of at least one portion of the decoder.

3. The device of claim 1 wherein the power consumption is varied by varying at least one parametric value selected from the group of clocking frequency, power supply voltage, and transistor back bias voltage.

4. The device of claim 1 wherein the encoding description data includes a slice type of the input stream.

5. The device of claim 2 wherein the decoder comprises reverse entropy logic and macroblock processing logic.

6. The device of claim 2 wherein the power management controller is operative to control the clocking frequency of a plurality of clocks including a memory clock, a decoder clock, and a video clock if the encoding scheme description data is determined to indicate an encoding selected from at least one of the group of CAVLC, CABAC, and MBAFF.

7. The device of claim 2 wherein the power management controller is operative to control the clocking frequency of a plurality of clocks including a memory clock, a decoder clock, and a video clock if the encoding description data is determined to indicate a slice type selected from the group of I, P, and B.

8. The device of claim 2 further comprising a second decoder that is selected for decoding in response to the determination of the encoding description data.

9. A method for reducing power consumption for a video decoder comprising:
determining input stream encoding scheme description data to select one of a plurality of different power consumption states for a video decoder; and
in response to the determination, varying power consumption of at least one operational portion of the video decoder.

10. The method of claim 9 wherein determining input stream encoding description data includes decoding the input stream.

11. The method of claim 9 wherein the encoding description data include the slice type of the input stream.

12. The method of claim 9 wherein varying power consumption includes reducing a clocking frequency if the encoding description data is determined to indicate CAVLC encoding.

13. The method of claim 9 wherein varying power consumption includes varying a parametric value of at least one operating portion of the video decoder.

14. The method of claim 13 wherein the parametric value is from the group of clocking frequency, power supply voltage, and transistor back bias voltage.

15. The method of claim 9 further comprising determining if more than one input stream is received and, in response to the determination, increasing the power consumption of at least one operational portion of the video decoder.

16. The method of claim 9 wherein varying power consumption of at least one operational portion of the video decoder comprises:
analyzing header information in an input stream to obtain profile and level information on a per-block, slice, frame or stream basis;
using a power management control table to obtain clock settings and power supply settings for various decoder circuits; and
a clock generator and power supply to provide clock settings and power supply settings from the table.

17. A video decoding system comprising:
a decoder operative to receive an input stream and to determine encoding scheme description data from the input stream;

a first processor operatively coupled to the decoder and operative to receive the encoding description data and determine power control and status from the encoded description data;
a second processor operatively coupled to the first processor and operative to select one of a plurality of different power consumption states for the video decoder, in response to the determination of the power control and status, and vary power consumption of at least one operational portion of the video decoder; and
a wireless interface operatively coupled to the decoder and operative to receive the input stream wirelessly.

18. The system of claim 17 comprising a memory controller and memory operatively coupled to the memory controller.

19. The system of claim 18 wherein the second processor is operative to at least vary a clocking frequency of the decoder and the memory controller and the power supply voltage of the memory.

20. The system of claim 17 wherein the encoding description data includes the slice type of the input stream.

* * * * *